UNITED STATES PATENT OFFICE.

JOHN B. LEONARD, OF MEMPHIS, TENNESSEE.

ANTISLIPPAGE DRESSING FOR BELTING.

No. 822,005.  Specification of Letters Patent.  Patented May 29, 1906.

Application filed March 13, 1903. Serial No. 147,663.

*To all whom it may concern:*

Be it known that I, JOHN B. LEONARD, a citizen of the United States, residing at Memphis, in the county of Shelby and State of Tennessee, have invented certain new and useful Improvements in Antislippage Dressing for Belting, of which the following is a specification.

My invention relates to compositions designed to render belts antislipping; and the object of the invention is to provide a composition of this character for the various kinds of beltings, which when applied will provide the surface of the belting with a flexible wearing-film of such a degree of hardness as to prevent the absorption by the belting of the oil contained in the composition of the film, the absorption of which destroys the original character of the composition and is injurious to the belting.

The composition of the invention, while producing an antislippage wearing-surface, is also designed to serve as a protecting-film to preserve the belting, as by its use the moisture and oil are prevented from entering into the pores of the belting, and the natural condition of the belt material is maintained.

In forming the composition I employ, in substantially the following proportions, rosin three parts, beeswax two parts, and tallow or neats-foot oil five parts and combine these ingredients by subjecting the same to steam-heat, such heat being used for the reason that the effect of fire-heat is to destroy the adhesive qualities of the composition. The resultant is a semihard mass when cooled and which for its application upon belting must be heated and applied while in a fluid state, so as to enter sufficiently into the surface pores of the belting and be distributed in a thin coating over the surface. To secure the proper distribution of the composition, it is preferably applied to the belting while the same is in motion. This composition leaves the belting with a smooth and apparently hard yet very adhesive and elastic film, which is so efficient for the purposes intended that the belting can be run while very loose without the possibility of any slippage occurring.

It will be observed that in using an animal oil, such as tallow and neats-foot oil, a softening agency is employed which has a natural affinity for leather and other belting material and is, moreover, rendered the less injurious by reason of the fact that this softening agency is incorporated in the composition in such a manner and in such proportion as to practically prevent its absorption by the belting, though insuring the complete filling of the surface pores by the composition when melted, so that the surface film of the composition will be retained, as well as rendered elastic.

I am aware that the ingredients of my composition have been combined variously to form compounds for stuffing leather and for providing belting with an adhesive surface. The present invention, however, is distinguished from a stuffing composition, as the composition of the invention does not enter into the structure of the belting material, but merely surfaces the belting after the manner of a varnish, and the composition of the invention is distinguished from antislippage dressings employing the ingredients of the invention in that such dressings are in the nature of pastes which are applied cold and are open to the objections which the present invention is designed to obviate. It will therefore be seen that a surface dressing has been produced of such character and consistency as to be retained by the pores of the belting material without being absorbed throughout the fibrous structure thereof, which absorption causes the oil to be extracted from the rosin and renders the composition ineffective, while injuring the belting.

What I claim is—

An antislippage composition for belting, consisting of, and in the proportions, substantially, rosin, three parts, beeswax, two parts, and animal oil, five parts, said composition being adapted for application by melting and to form when cold a tough, elastic and non-absorbable skin or coating for the belt-surface.

In testimony whereof I have signed my name to this specification in presence of two witnesses.

JNO. B. LEONARD.

Witnesses:
 SAM A. JONES,
 H. B. HOSFORD.